(12) United States Patent  (10) Patent No.: US 8,407,981 B1
Johnson et al.  (45) Date of Patent: Apr. 2, 2013

(54) JOHNSON SEXTON CYCLE ROCKET ENGINE

(75) Inventors: Gabriel L Johnson, Jupiter, FL (US); Thomas D Sexton, Boca Raton, FL (US)

(73) Assignee: Florida Turbine Technologies, Inc., Jupiter, FL (US)

( * ) Notice: Subject to any disclaimer, the term of this patent is extended or adjusted under 35 U.S.C. 154(b) by 728 days.

(21) Appl. No.: 12/700,937

(22) Filed: Feb. 5, 2010

(51) Int. Cl.
 *F02K 9/46* (2006.01)
(52) U.S. Cl. .................. 60/204; 60/259; 60/260
(58) Field of Classification Search ........... 60/257–260, 60/267, 204, 206
See application file for complete search history.

(56) References Cited

U.S. PATENT DOCUMENTS

| | | | |
|---|---|---|---|
| 4,589,253 A * | 5/1986 | Wagner | 60/259 |
| 4,998,410 A * | 3/1991 | Martinez-Leon et al. | 60/259 |
| 5,873,241 A * | 2/1999 | Foust | 60/259 |
| 6,226,980 B1 * | 5/2001 | Katorgin et al. | 60/258 |
| 7,389,636 B2 * | 6/2008 | Fowler et al. | 60/259 |

* cited by examiner

*Primary Examiner* — Ted Kim

(74) *Attorney, Agent, or Firm* — John Ryznic

(57) ABSTRACT

An expander cycle rocket engine includes secondary turbopump to further pressurize a gaseous fuel discharged from a primary turbine prior to entering the combustion chamber. The secondary turbopump is driven by fuel bled off from the primary fuel pump. A gaseous fuel that is heated from passing around the nozzle that is passed through the primary turbine to drive the primary fuel and oxidizer pumps is then passed through the secondary turbine to drive the secondary fuel compressor. With the secondary turbopump used in the Johnson-Sexton cycle engine, a thrust produced by the expander cycle rocket engine is greater than those obtained by prior art expander cycle rocket engines due to the square-cube rule.

2 Claims, 2 Drawing Sheets

JOHNSON SEXTON CYCLE ROCKET ENGINE

CROSS-REFERENCE TO RELATED APPLICATIONS

None.

BACKGROUND OF THE INVENTION

1. Field of the Invention

The present invention relates generally to a rocket engine, and more specifically to an expander cycle rocket engine with high pressure combustion.

2. Description of the Related Art Including Information Disclosed Under 37 CFR 1.97 and 1.98

Rocket engines that use cryogenic fuels and oxidizers such as a gas generator cycle and the staged combustion cycle rocket engines use some of the fuel and oxidizer to pre-burn and drive the turbo-pumps that deliver the high pressures to the engine nozzle. In the gas generator cycle, a very small portion of the fuel and the oxidizer is bled off from that delivered to the main combustion chamber (MCC) and diverted into a small pre-burner and combusted to produce a hot gas flow that is then used to drive the turbo-pumps that supply the high pressure fuel and oxidizer to the main combustion chamber. The exhaust gas from the turbo-pumps is then vented overboard. In the staged combustion cycle, a small portion of the propellant (either the oxidizer or the fuel) is diverted and combined with all of the other propellant to partially combust the combination, which is then passed through the turbo-pumps to drive these. This mixture is then sent to the main combustion chamber along with the remainder of the propellant and is combusted in the main combustion chamber. In both the gas generator and staged combustion cycles, some of the fuel and oxidizer is used to produce power to drive the turbo-pumps and therefore not used to produce power in the rocker engine nozzle. Also, because of the high turbo-pump inlet temperature, the turbine driving the turbo-pump is subject to thermal shock and thermal mechanical failure, or TMF.

An expander cycle rocket engine passes a propellant (typically the fuel) through a heat exchanger formed within or around the nozzle to transfer heat from the combustion process in the nozzle to heat up the fuel. The heated fuel (in the case of most cryogenic fuels and oxidizers is hydrogen) is passed through the turbine that drives both of the turbo-pumps to pressurize the fuel and the oxidizer prior to injection into the main combustion chamber for combustion. The expander cycle is more efficient than either of the gas generator and staged combustion cycles described above because all of the fuel and oxidizer is used in combustion and exhausted through the throat and then into the nozzle for expansion. The expander cycle rocket engine has many advantages over the staged combustion and gas generator cycles. Rather than using a pre-burner, the engine routes liquid propellant from the pump discharge to the nozzle. This flow cools the nozzle and heats up the liquid turning it into a gas. The high pressure gas is then routed to the turbine inlet to drive the turbo-pump(s). The turbine is driven by gas expanded from heat transfer in the engine nozzle rather than from products of combustion from a pre-burner as used in the gas generator and staged combustion engine cycles. As a result, the turbine temperature is significantly lower than for the other cycles resulting is longer life due to the elimination of thermal shock and thermal mechanical fatigue (TMF). The expander cycle rocket engine has proven to be the most reliable engine and has demonstrated superior re-start capability. However, in prior art expander cycle rocket engines, the thrust this engine is capable of producing has reached a maximum limit. As the size of the nozzle increases, the engine mass flow increases at a greater rate than the surface area of the nozzle. As a result, a limit is reached when there is insufficient heat transfer in the nozzle to drive the turbo-pump(s) required to provide the mass flow to the engine. Additionally, for a given mass flow, the chamber pressure is also limited based on the turbine power available for driving the turbo-pumps.

High thrust (in excess of 100,000 pounds) expander cycle rocket engines have traditionally been limited to a chamber pressure below 1,500 psia because of a lack of turbine power available to the fuel turbo-pump. In a typical expander cycle rocket engine, fuel from the fuel turbo-pump is pumped through the cooling liner and tubular nozzle of the engine's nozzle assembly where the fuel is heated and then fed to a turbine which drives the turbo-pumps. In order to increase the combustion chamber pressure, flow to the combustion chamber must be increased. However, as fuel flow through the cooling liner and tubular nozzle increases, the temperature of the fuel at the turbo-pump turbine inlet decreases due to the increase in mass flow rate of the fuel or to provide higher discharge pressure. At the same time, the fuel turbo-pump must do more work to provide the increased mass flow rate of the fuel. Although the energy available to the fuel turbo-pump turbine is a function of both the mass flow rate of the fuel and the turbine inlet temperature, the increase in the mass flow rate of fuel cannot offset the resulting decrease in turbine inlet temperature which occurs as a result of the increased fuel flow rate. Consequently, the decrease in turbine inlet temperature and the increase in work required by the turbo-pump at the higher fuel flow rates act to limit the maximum fuel flow rate to the combustion chamber, thereby limiting combustion chamber pressure.

In summary, the expander cycle rocket engine uses heat from the nozzle to heat up the fuel to drive the turbo-pumps that pressurized the fuel and oxidizer for combustion in the nozzle (combustion chamber). To increase the thrust of the rocket engine, a larger propellant flow and/or discharge pressure is required. As the engine/nozzle size increases, the propellant volume increases faster than the surface area of the nozzle. As the nozzle volume increases and more fuel and oxidizer is needed to be pressurized, the amount of heat transferred to the fuel for driving the turbo-pumps becomes less than required to supply the higher pressures. As a result of increasing the nozzle volume, the efficiency of the expander cycle rocket engine becomes less and less. There is a limit in nozzle size using the present technologies because of this effect.

The maximum thrust in a rocket nozzle occurs when the exhaust pressure of the nozzle is equal to the outside pressure of the nozzle. As a result, the rocket thrust rises with increasing altitude.

In the prior art expander cycle engine, the amount of heat generated is limited by the size of the nozzle. The problem lies with the square-cube rule. Because of the necessary phase change, the expander cycle is thrust limited by the square-cube rule. As the size of the bell-shaped nozzle increases with increasing thrust, the nozzle surface area (from which heat can be extracted to expand the fuel) increases as the square of the radius. However, the volume of fuel that must be heated increases as the cube of the radius. Thus, there exists a maximum engine size of approximately 300 kN of thrust beyond which there is no longer enough nozzle area to heat enough fuel to drive the turbines and hence the fuel pumps.

BRIEF SUMMARY OF THE INVENTION

The present invention is an expander cycle rocket engine with an additional turbine that is used to drive a compressor that increases the pressure of the fuel flow from the primary turbine resulting in a higher combustion chamber pressure. The oxidizer portion of the prior art expander cycle remains unchanged.

DETAILED DESCRIPTION OF THE INVENTION

Figure 1:
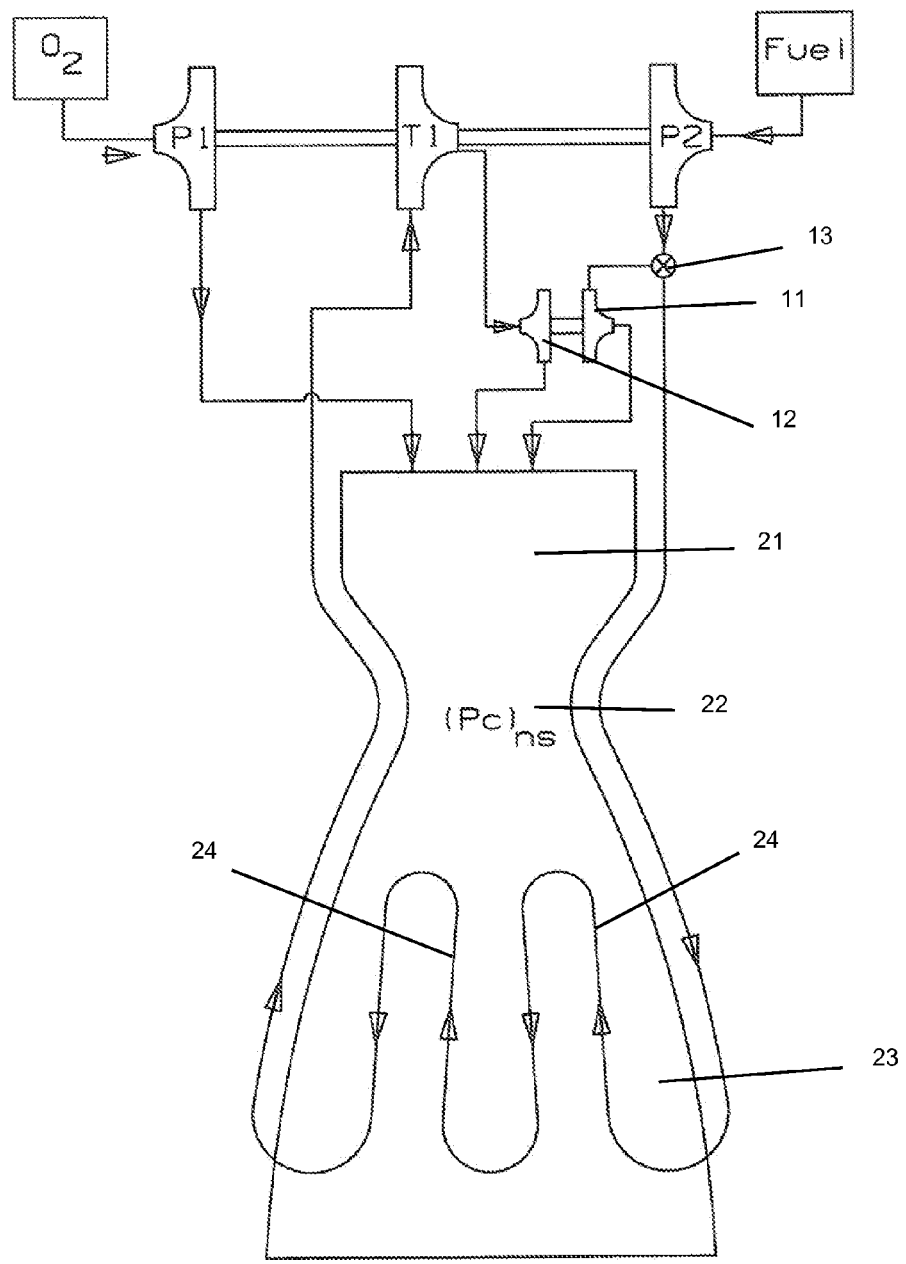
FIG. 1 shows an expander cycle rocket engine with an additional turbo-pump of the present invention.

The expander cycle rocket engine of the present invention is shown in FIG. 1 and includes a combustion chamber 21, a throat or nozzle 22, an expansion chamber 23, and a primary turbopump to supply an oxidizer and a fuel under high pressure to the combustion chamber 21. The primary turbopump includes a turbine T1 that drives a primary oxidizer pump P1 and a primary fuel pump P2. In this embodiment, the oxidizer is liquid oxygen and the fuel is liquid hydrogen. Other oxidizers or fuels can be used in the expander cycle rocket engine.

The fuel from the primary fuel pump P2 is passed through an arrangement of tubes 24 integrated with the nozzle 23 to absorb energy from heat generated by the exiting combustion products. The liquid fuel is heated to produce a gaseous fuel that is then passed through the primary turbine T1 to drive both of the primary pumps P1 and P2.

In order to further increase the pressure of the combustion chamber, some of the liquid fuel from the primary fuel pump P2 is bled off and passed through a secondary turbopump that includes a secondary fuel pump 12 driven by a secondary turbine 11. As seen in FIG. 1, the secondary turbine 11 is driven by the fuel discharged from the primary fuel pump P2. Fuel from the primary pump P2 passes through a bypass valve 13 and into the secondary turbine 11. The bypass valve 13 can regulate the amount of fuel bled off from the primary fuel pump P2. The gaseous fuel discharged from the primary turbine T1 is passed through the secondary fuel compressor 12 and further pressurized prior to the gaseous fuel entering the combustion chamber 21. The primary pumps P1 and P2 pump a liquid while the secondary compressor 12 compresses a gas. The fuel used to drive the secondary turbine 11 is then discharged into the combustion chamber 21. Because the engine thrust is proportional to chamber stagnation pressure, an increase in the chamber pressure yields a direct increase in total engine thrust. This allows greater thrust levels than the prior art expander cycle rocket engine which is limited by the square-cube rule.

Figure 2:
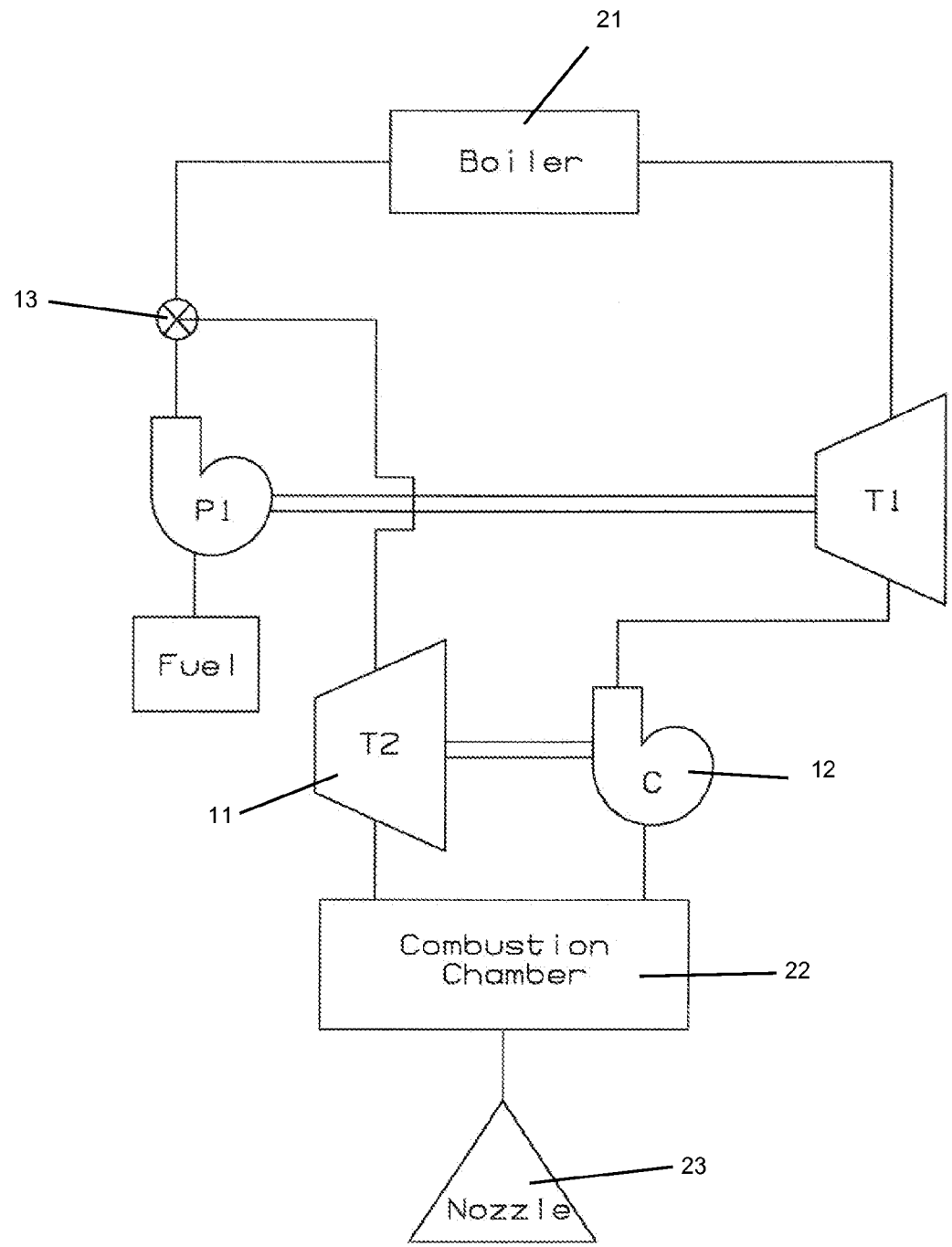
FIG. 2 shows a detailed view of the secondary fuel pressurization system of the present invention.

FIG. 2 shows a detailed cross section view of a system that can make use of the secondary turbopump to further increase a pressure of a combustion chamber. a boiler is representative of the tubes 24 integral with the nozzle 23 of figure in that the boiler adds heat to a liquid fuel pumped by a primary fuel pump P1. The gaseous fuel that passes from the boiler is passed through the primary turbine T1 to drive the primary fuel pump P1. The gaseous fuel from the primary turbine T1 is then passed through the secondary fuel compressor 12 to further increase its pressure prior to being discharged into the combustion chamber 21. Some of the liquid fuel from the primary fuel pump P1 is bled off through a bypass valve 13 and passed through the secondary turbine T2 to drive the secondary fuel compressor C, which is then discharged into the combustion chamber 22. The fuel and the oxidizer is burned in the combustion chamber 22 and expanded through the nozzle 23 to produce thrust. In the FIG. 2 embodiment, the boiler can be any means to add additional heat to the fuel to produce a gaseous fuel that can be used to drive the primary turbine T1. The Above described expander cycle for the rocket engine with the addition of the secondary turbine and compressor to boost the gaseous fuel pressure beyond that capable of with the prior art expander cycle rocket engine is considered to be the Johnson Sexton cycle.

We claim:

1. An expander cycle rocket engine comprising:

A combustion chamber, a throat and a nozzle to burn an oxidizer and a fuel and produce thrust;

a primary turbopump including a primary oxidizer pump and a primary fuel pump both driven by a primary turbine;

a fuel passage associated with the nozzle to pass liquid fuel from the primary liquid fuel pump to absorb heat from the nozzle and produce a gaseous fuel to drive the primary turbine; and, a secondary turbopump to further increase the pressure of the gaseous fuel prior to entering the combustion chamber;

the secondary turbopump including a second turbine driven by fuel from the primary fuel pump and a secondary fuel compressor supplied with fuel from a discharge from the primary turbine.

2. A process for operating an expander cycle rocket engine, the expander cycle rocket engine including a combustion chamber and a throat and a nozzle, a primary oxidizer pump and a primary fuel pump, a primary turbine connected to rotatably drive the two primary pumps, and heat absorbing tubes formed within the nozzle to convert a liquid fuel into a gaseous fuel, the process comprising the steps of:

pumping a liquid oxidizer and passing the liquid oxidizer into the combustion chamber;

pumping a liquid fuel and passing the liquid fuel through the heat absorbing tubes to convert the liquid fuel into a gaseous fuel;

driving the primary turbine with the gaseous fuel from the heat absorbing tubes;

bleeding off a portion of the liquid fuel from the primary liquid fuel pump to a secondary turbine;

passing the gaseous fuel from the primary turbine into a secondary compressor to further compress the gaseous fuel;

driving the secondary compressor by the secondary turbine; and, passing the further compressed gaseous fuel from the secondary compressor into the combustion chamber.

* * * * *